(12) United States Patent
Lin

(10) Patent No.: US 7,461,792 B2
(45) Date of Patent: Dec. 9, 2008

(54) FIXTURE OF MEMORY CARD BASE

(76) Inventor: Sung-tien Lin, 8F., No. 12, Sec. 1, Chongsing Rd., Wugu Shiang, Taipei County (TW) 24872

( * ) Notice: Subject to any disclaimer, the term of this patent is extended or adjusted under 35 U.S.C. 154(b) by 102 days.

(21) Appl. No.: 11/588,618

(22) Filed: Oct. 30, 2006

(65) Prior Publication Data

US 2008/0186658 A1    Aug. 7, 2008

(51) Int. Cl.
*G06K 19/06* (2006.01)
*H01R 13/62* (2006.01)

(52) U.S. Cl. .................. 235/492; 235/441; 439/159

(58) Field of Classification Search .............. 235/486, 235/492; 439/159
See application file for complete search history.

(56) References Cited

U.S. PATENT DOCUMENTS 5,120,946 A * 6/1992 Hug et al. .................. 235/441

6,981,885 B2 * 1/2006 Oh ............................. 439/159

* cited by examiner

*Primary Examiner*—Steven S Paik
*Assistant Examiner*—Sonji Johnson

(57) ABSTRACT

A fixture of a memory card base includes an inverted "S" or "S" shaped slot on a cover panel of a memory card base, a den in the shape of an acute triangle disposed at a back-and-forth resuming movable stand on a side of the base. A pillar hole or a through hole is disposed at an upper edge of the den; a latch hook being an inverted "L" or "L" shaped rod body includes a first protruding shaft on the rod body, and a second protruding shaft at the middle of a front side of the rod body. The latch hook is pivotally coupled to the pillar hole or through hole by the first protruding shaft, and a second protruding shaft is embedded into the inverted "S" or "S" shaped slot on the cover panel.

1 Claim, 10 Drawing Sheets

Fig_6
PRIOR ART

FIXTURE OF MEMORY CARD BASE

BACKGROUND OF THE INVENTION

1. Field of the Invention

The present invention relates to a fixture of a memory card base, and more particularly to a fixture of a memory card base capable of securely fixing a memory card and maintaining a locked status for fixing/positioning the memory card.

2. Description of the Related Art

Referring to FIGS. 6 to 9 for a fixture 3*a* of a traditional memory card base 2*a*, the fixture 3*a* comprises: a "[" (which is known as a square bracket) shaped slot 221*a* or an inverted "[" shaped slot (whose back-and-forth resuming movable stand 31*a* is installed on the left side of the base 21*a* instead of being installed on the right side as shown in FIGS. 6 to 9) disposed on a cover panel 22*a* of the traditional memory card base 2*a*; a den 311*a* substantially in the shape of an acute triangle and installed at a back-and-forth resuming movable stand 31*a* on a side of the base 21*a* of the memory card base 2*a* as shown in FIGS. 7 and 9 and having an inverted acute-triangle stairway-like protruding platform 312*a* disposed in the den 311*a*; and a latch bracket 32*a* as shown in FIG. 10, being an inverted "V" shaped elastic plate 320*a*, and comprising: a transversal "V" shaped latch hook 321*a* extended from an end of an internal plate of the elastic plate 320*a*; and a protruding plate 322*a* disposed at an internal plate of the elastic plate 320*a*. The latch bracket 322*a* is embedded directly in the den 311 of the back-and-forth resuming movable stand 31*a* and supported by the inverted acute-triangle stairway-like protruding platform 312*a* disposed in the den 311*a* and fixed in the den 311; and after a cover panel 22*a* of the traditional memory card base 2*a* is covered onto the base 21*a* of the traditional memory card base 2*a* as shown in FIGS. 6 and 8, such that a protruding plate 322*a* on the latch bracket 32*a* is embedded into a "[" (middle bracket) shaped slot 221*a* on the cover panel 22*a* of the memory card base 2*a*.

Referring to FIGS. 7 and 9 for a general memory card 1, the memory card is a rectangular sheet 10 having a wide protruding platform 11 protruded from the right side or the left side and a transversal wide "V" shaped gap 12 disposed at an external edge of an internal side proximate to the protruding platform 11. Before the memory card 1 is inserted into the traditional memory card base 2*a* as shown in FIGS. 6 and 7, the protruding plate 322*a* on the latch bracket 32*a* in the fixture 3*a* is situated at the front end of the "[" shaped slot 221*a* or inverted "[" shaped slot on the cover panel 22*a* of the traditional memory card base 2*a* slightly towards the right side, and thus the inverted "V" shaped elastic plate 320*a* of the latch bracket 32*a* becomes "narrower", and the inverted "V" shaped latch hook 321*a* of the latch bracket 32*a* also shifts to the right side or the left side and moves out from the transversal wide "V" shaped gap 12 on the protruding platform 11 at the right side of the memory card 1 for inserting the memory card 1 into the card base 2*a*. However, when the memory card 1 is being inserted into the traditional memory card base 2*a*, the memory card 1 can drive the back-and-forth resuming movable stand 31*a* at a side of the base 21 of the card base 2*a* inward (which is upward in the figure) and also can drive the protruding plate 322*a* on the latch bracket 32*a* to extend into the "[" shaped slot 221*a* or inverted "[" shaped slot on the cover panel 22*a* of the card base 2*a* and shift to a position slightly on the left or right side of a rear end of the "[" shaped slot 221 or inverted "[" shaped slot, so as to form a wider inverted "V" shaped elastic plate 320*a* of the latch bracket 32*a*, and the transversal "V" shaped latch hook 321*a* at its end can shift to the left or right side and move into the transversal wide "V" shaped gap 12 on the protruding platform 11 at the right or left side of the memory card 1 (as shown in FIGS. 8 and 9) to latch the memory card 1 into the memory card base 2*a*.

Although the latch bracket 32*a* in the fixture 3*a* can be latched when a memory card 1 is inserted into a traditional memory card base 2*a*, the latch is not secured, and thus an external force can remove the memory card 1 easily. Since the latch bracket 32*a* is an inverted "V" shaped elastic plate 320*a* which is a thin sheet made of a phosphorous-copper alloy and has a limited elasticity, therefore the latch bracket 32*a* can be used for inserting a relatively new memory card 1, such that the transversal "V" shaped latch hook 321*a* at an end of an internal side of the elastic plate 320*a* is latched to the memory card 1. After the memory card 1 has been inserted into and removed from the traditional memory card base 2*a* repeatedly for many times, the transversal "V" shaped latch hook 321*a* on the latch bracket 32*a* will be deformed, and thus the memory card 1 can no longer be latched, positioned or locked securely, or the memory card 1 may even be loosened or fallen off easily.

SUMMARY OF INVENTION

The primary objective of the present invention is to overcome the shortcomings of the prior art by providing a fixture of a memory card base that can secure a memory card and maintain the memory card to be latched in a locked status, and the memory card will not be loosened or fallen off easily.

To achieve the foregoing objective, a fixture of a memory card comprises an "S" shaped slot or an inverted "S" shaped slot disposed on a cover panel of a memory card base; a den substantially in the shape of an acute triangle and disposed on a back-and-forth resuming movable stand that is installed at a side of a base of the memory card base and has a pillar hole or a through hole disposed at an upper edge in the den; and a latch hook substantially in an inverted "L" shaped rod body or an "L" shaped rod body and comprising: a first protruding shaft disposed on an end of the rod body and a second protruding shaft disposed substantially at the middle of a front side of the rod body; and the latch hook is pivotally coupled into a pillar hole or a through hole in the den on the back-and-forth resuming movable stand by a first protruding shaft of the rod body, and the second protruding shaft of the rod body is embedded in an "S" shaped slot or an inverted "S" shaped slot on the cover panel of the card base.

Before a memory card is inserted into a memory card base in accordance with the present invention, a second protruding shaft on the latch hook of a fixture in accordance with the present invention is situated at the front end of an "S" shaped slot or an inverted "S" shaped slot on a cover panel of the memory card base and shifted slightly towards the right side or the left side for driving a hook end of a horizontal rod at the lower side of an inverted "L" shaped rod body or an "L" shaped rod body of the latch hook to shift to the right side or the left side and move out from the external side of a protruding platform on the right side of the memory card, so as to insert the memory card into the memory card base successfully. When the memory card is inserted into the memory card base in accordance with the present invention, the memory card not only drives the back-and-forth resuming movable stand on a side of the base of the card base, but also drives the second protruding shaft on the latch hook to extend towards an "S" shaped slot or an inverted "S" shaped slot on the cover panel of the card base to shift a rear end of the "S" shaped slot or an inverted "S" shaped slot slightly to the left side or the right side, so as to guide the latch hook to be shifted slightly to the left side and move a hook end of a horizontal rod at the lower side of an inverted "L" shaped rod body or an "L" shaped rod body of the latch hook slightly to the left side or the right side, so as to latch into a transversal wide "V" shaped gap at the protruding platform on the right side of the memory card and secure the memory card into the card base, and maintain the locked status of the memory card, and thus the memory card will not be loosened or fallen off easily.

DETAILED DESCRIPTION OF THE PREFERRED EMBODIMENTS

The above and other objects, features and advantages of the present invention will become apparent from the following detailed description taken with the accompanying drawing.

Figure 1:
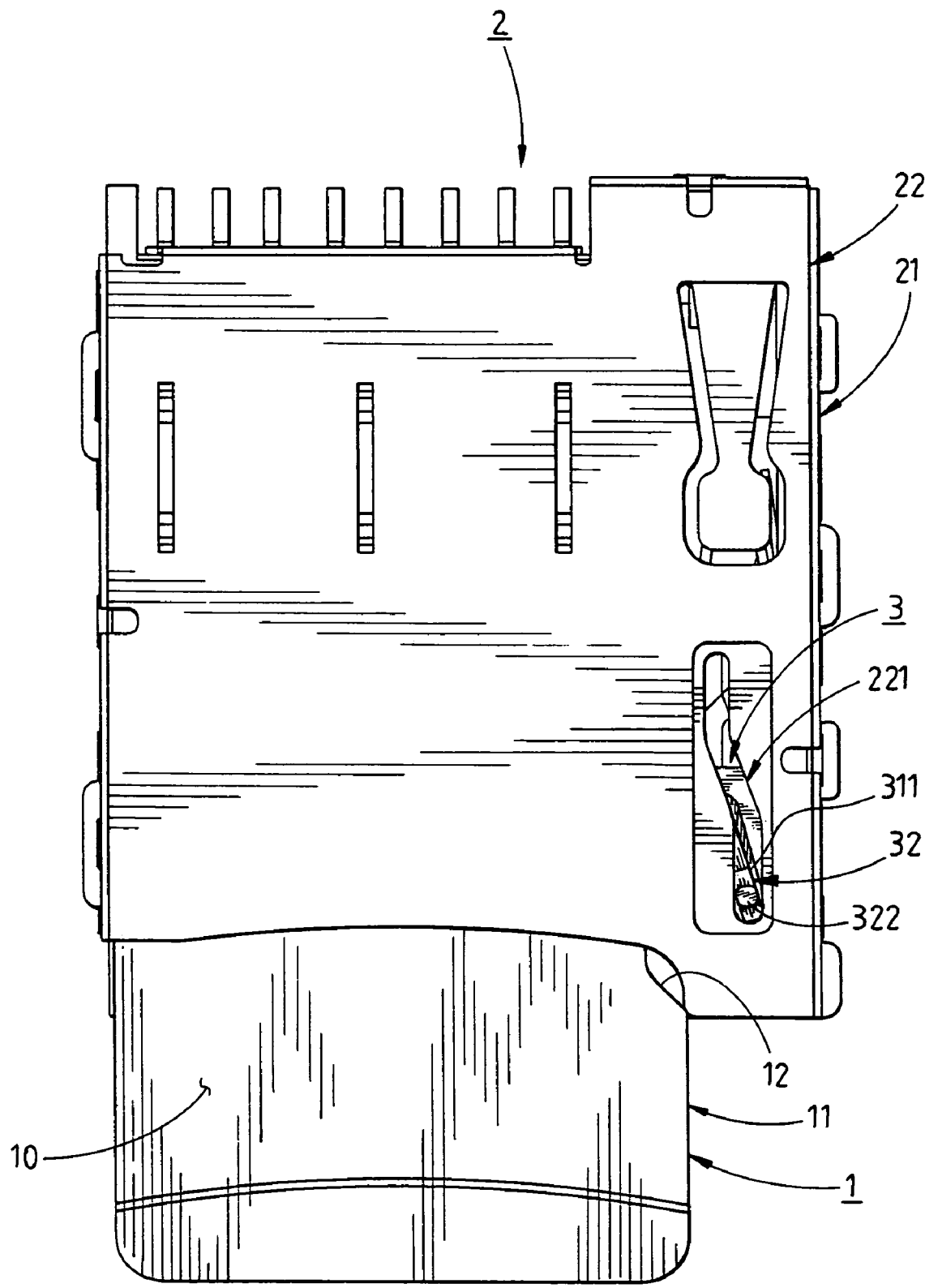
FIG. 1 is a top view of the movements of a memory card which has not been (or will be) inserted into a memory card base in accordance with the invention.
Figure 2:
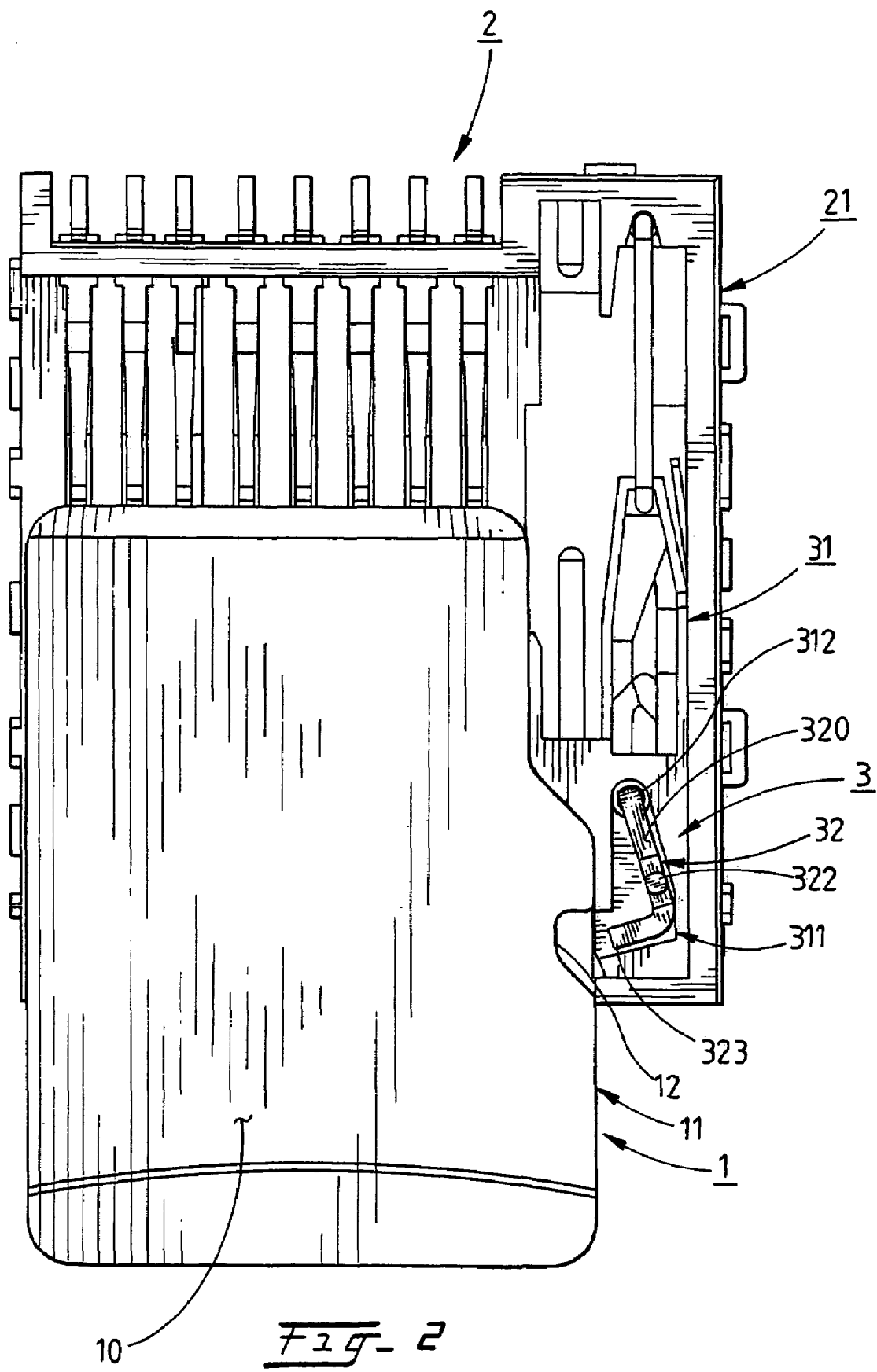
FIG. 2 is a top view of the movements of a memory card which has not been (or will be) inserted into a memory card base when a cover panel of a memory card base is lifted in accordance with the invention.
Figure 3:
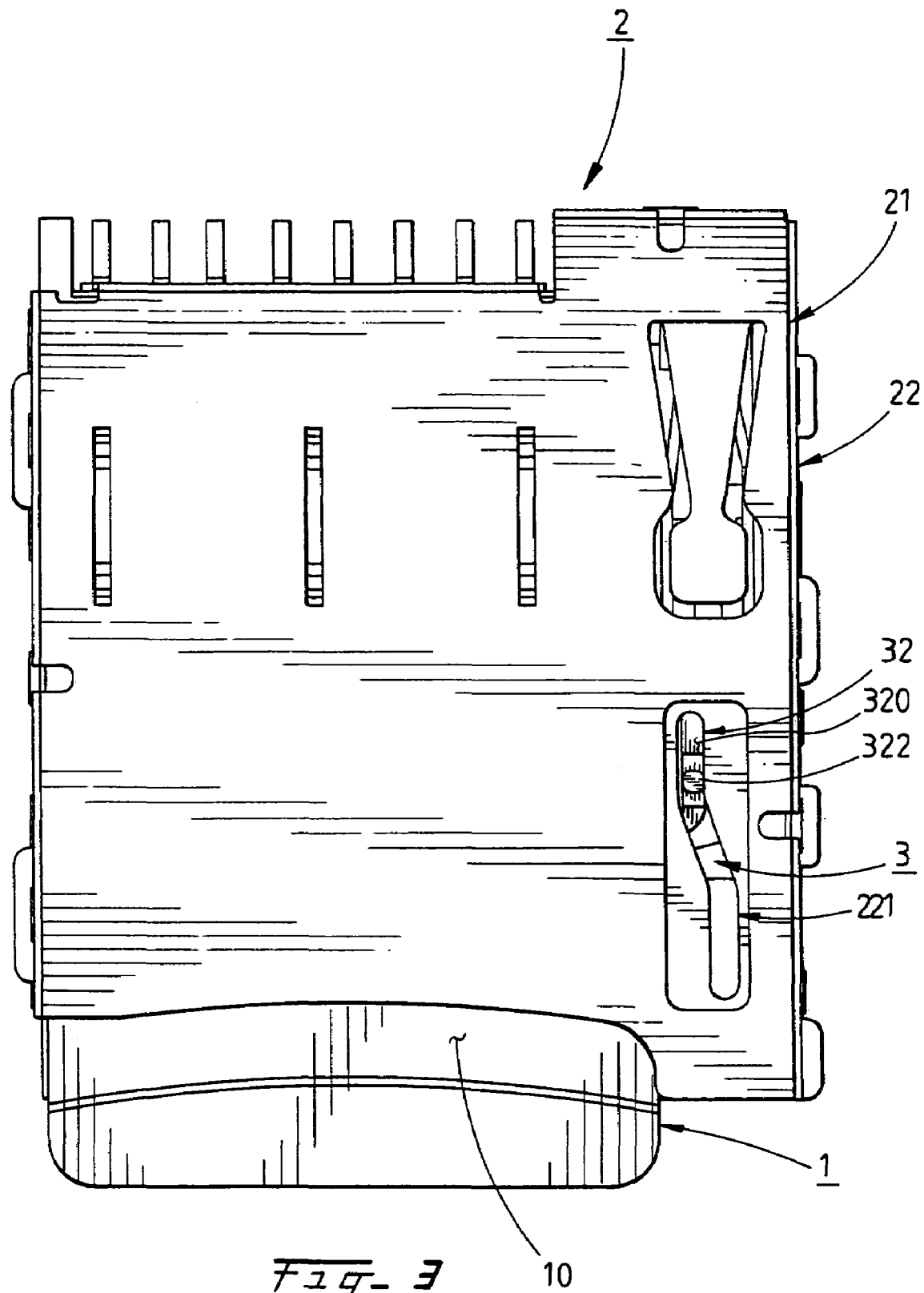
FIG. 3 is a top view of the movements of a memory card which has been inserted into a memory card base in accordance with the invention.
Figure 4:
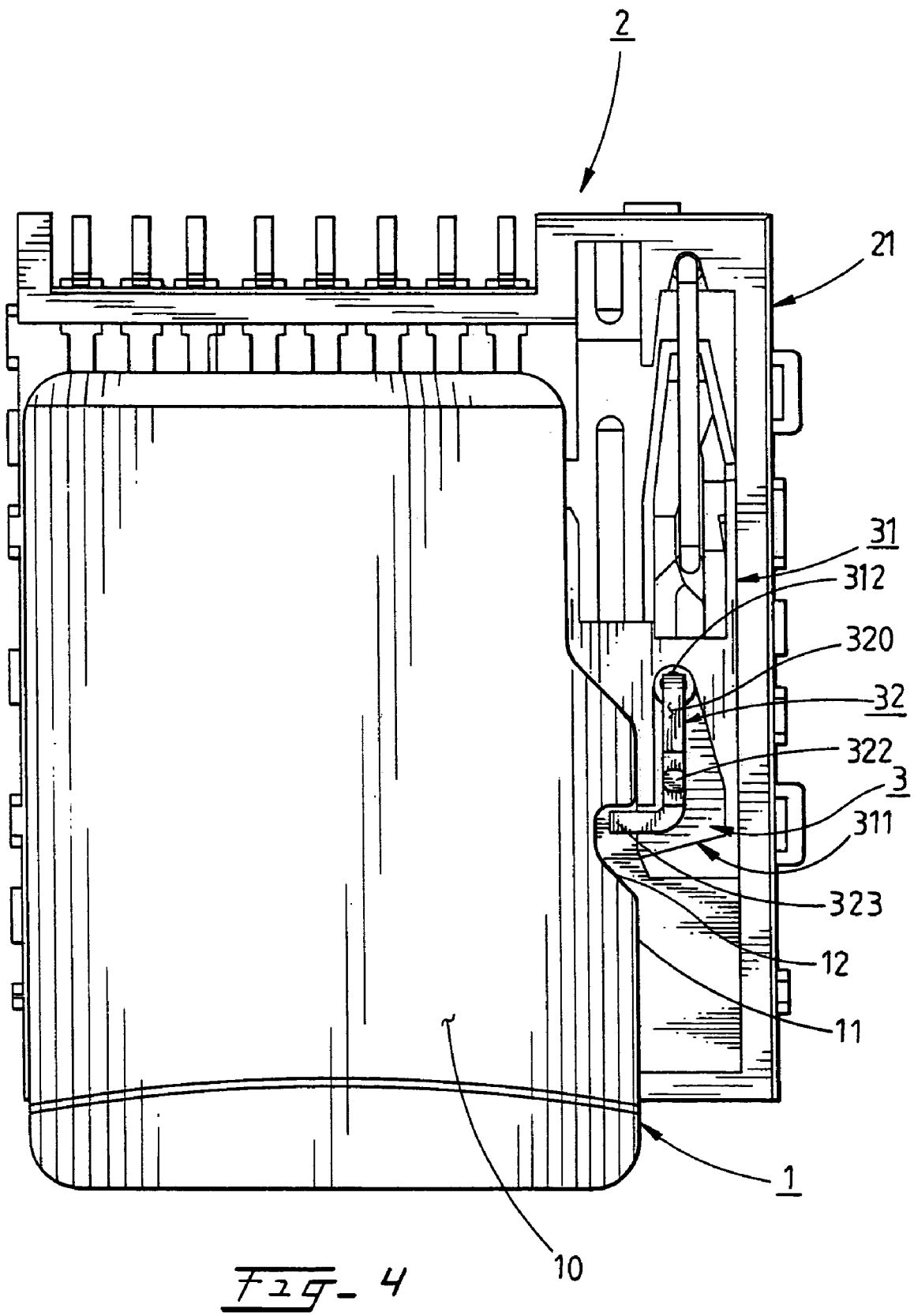
FIG. 4 is a top view of the movements of a memory card which has been inserted into a memory card base when a cover panel of a memory card base is lifted in accordance with the invention.
Figure 5:
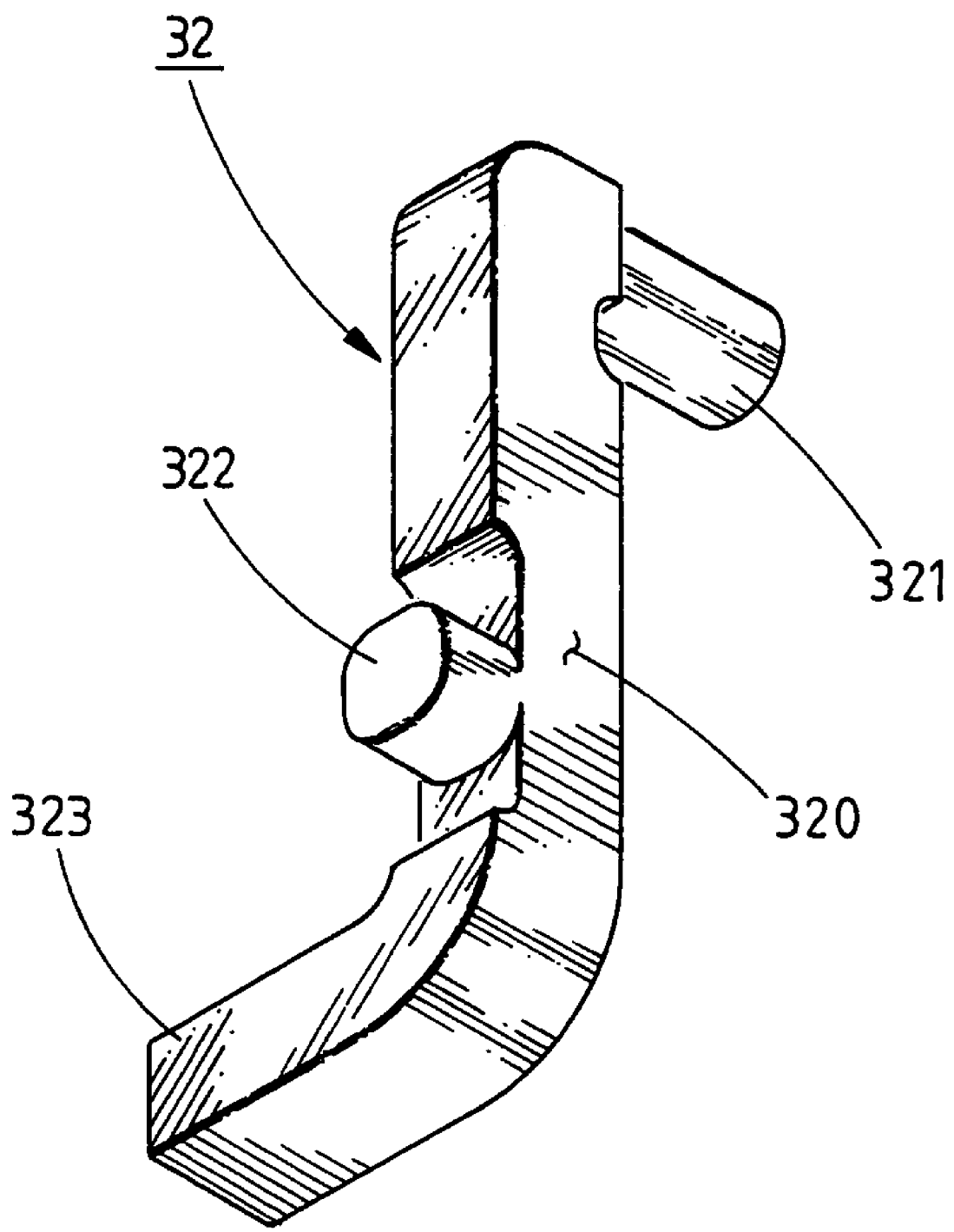
FIG. 5 is a perspective view of a latch hook in a fixture of a memory card case in accordance with the present invention.
Figure 6:
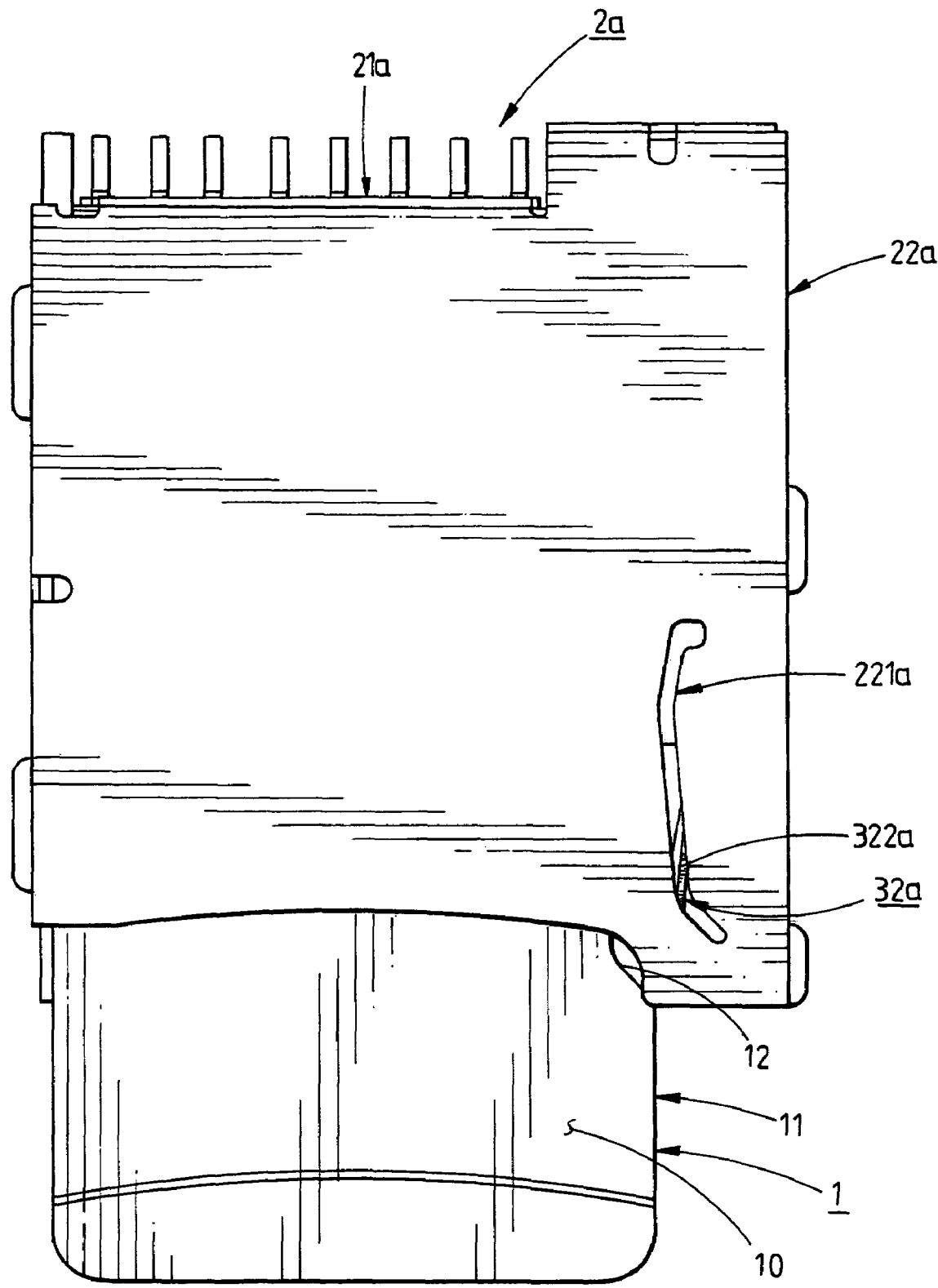
FIG. 6 is a top view of the movements of a memory card which has not been (or will be) inserted into a traditional memory card base in accordance with the invention.
Figure 7:
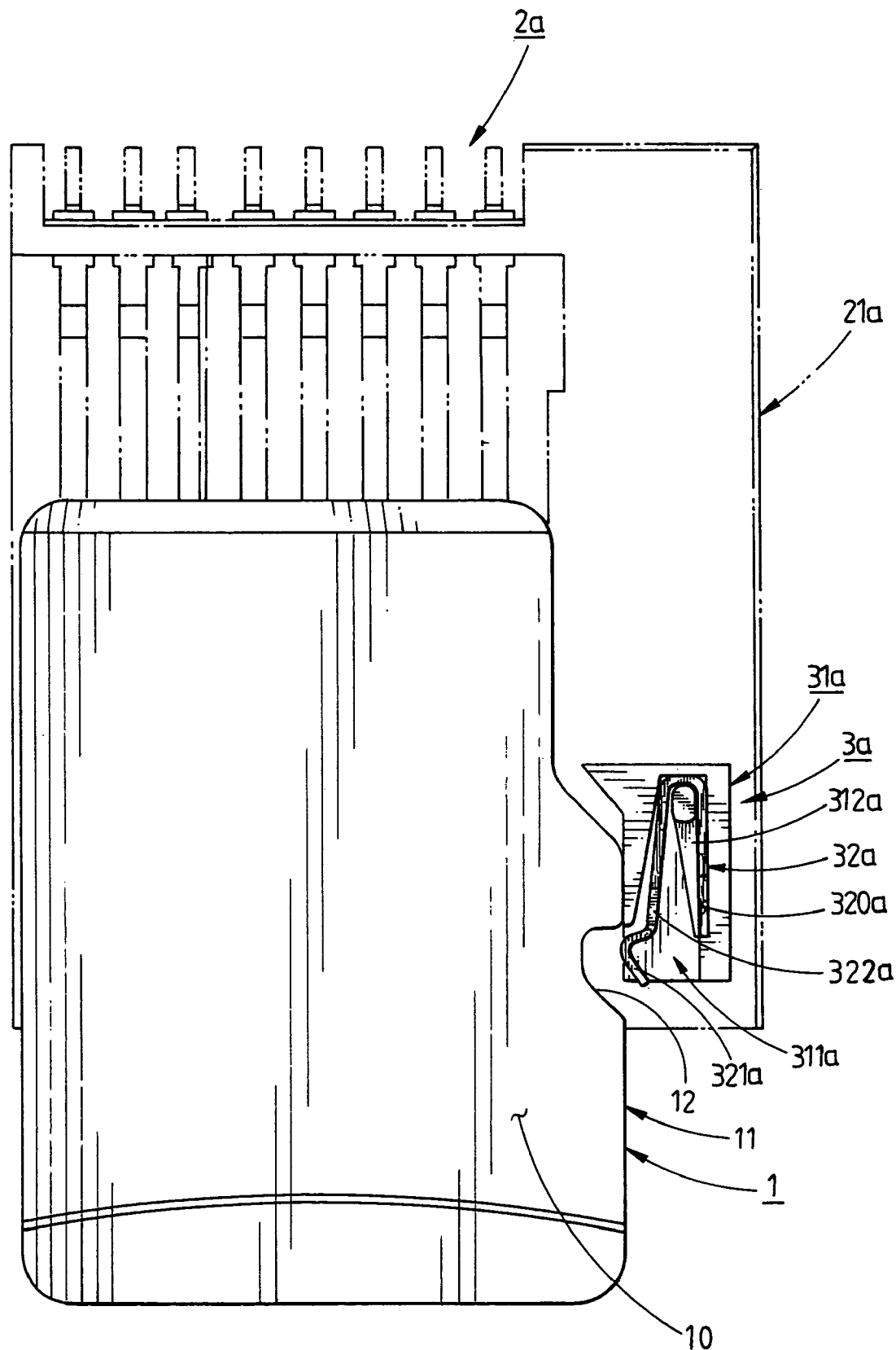
FIG. 7 is a top view of the movements of a memory card which has not been (or will be) inserted into a traditional memory card base when a cover panel of a memory card base is lifted.
Figure 8:
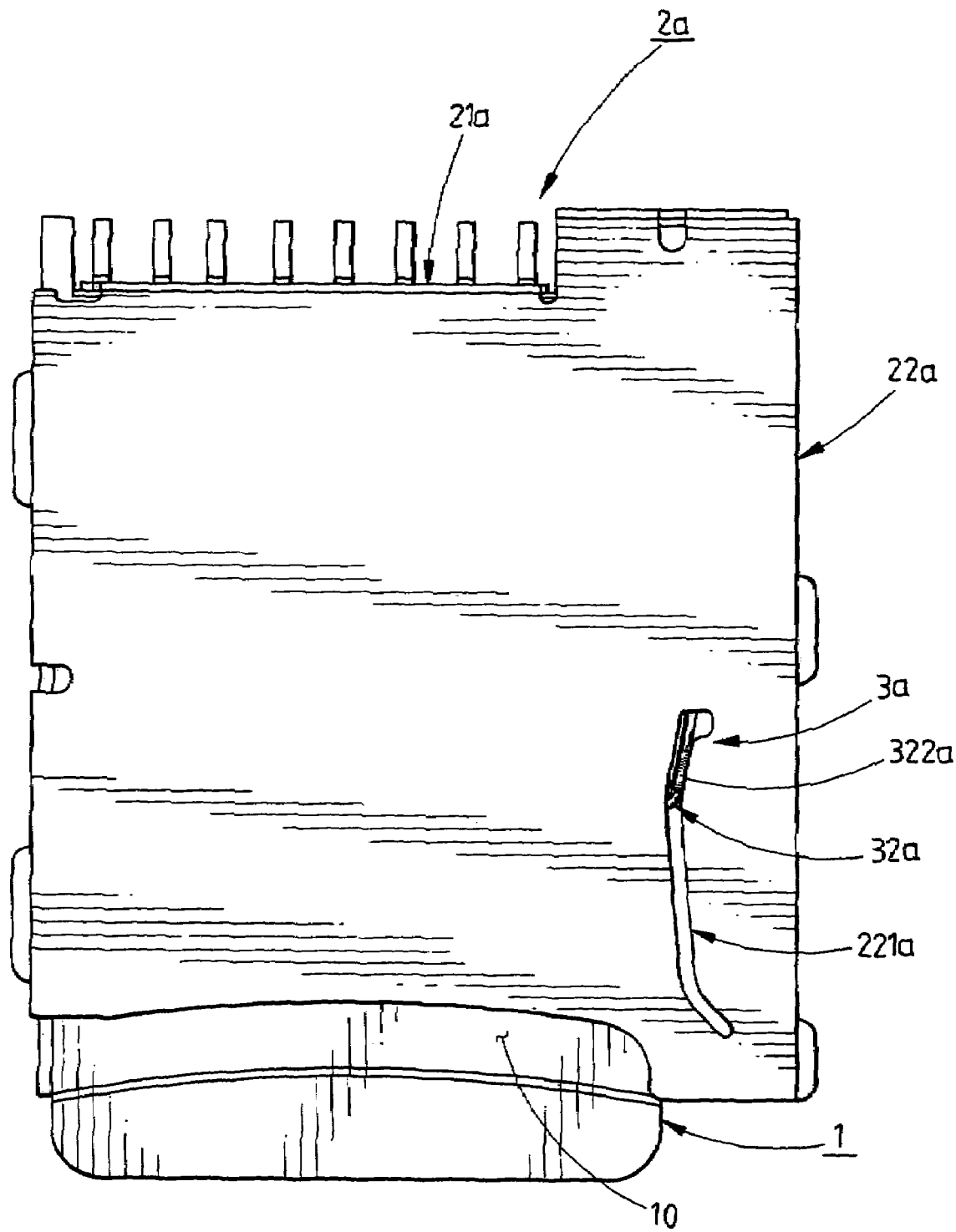
FIG. 8 is a top view of the movements of a memory card which has been inserted into a traditional memory card base.
Figure 9:
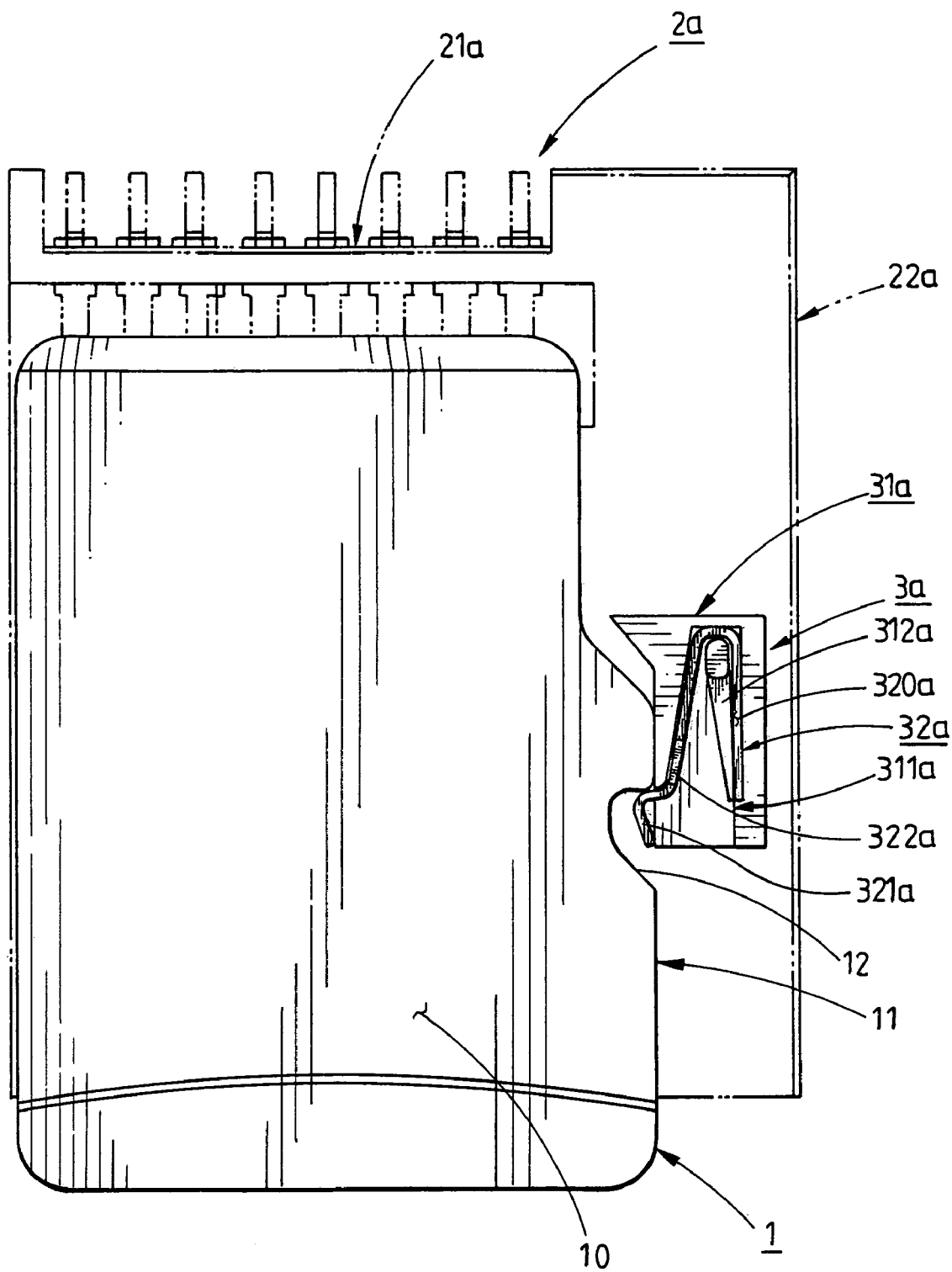
FIG. 9 is a top view of the movements of a memory card which has been inserted into a traditional memory card base when a cover panel of a memory card base is lifted.
Figure 10:
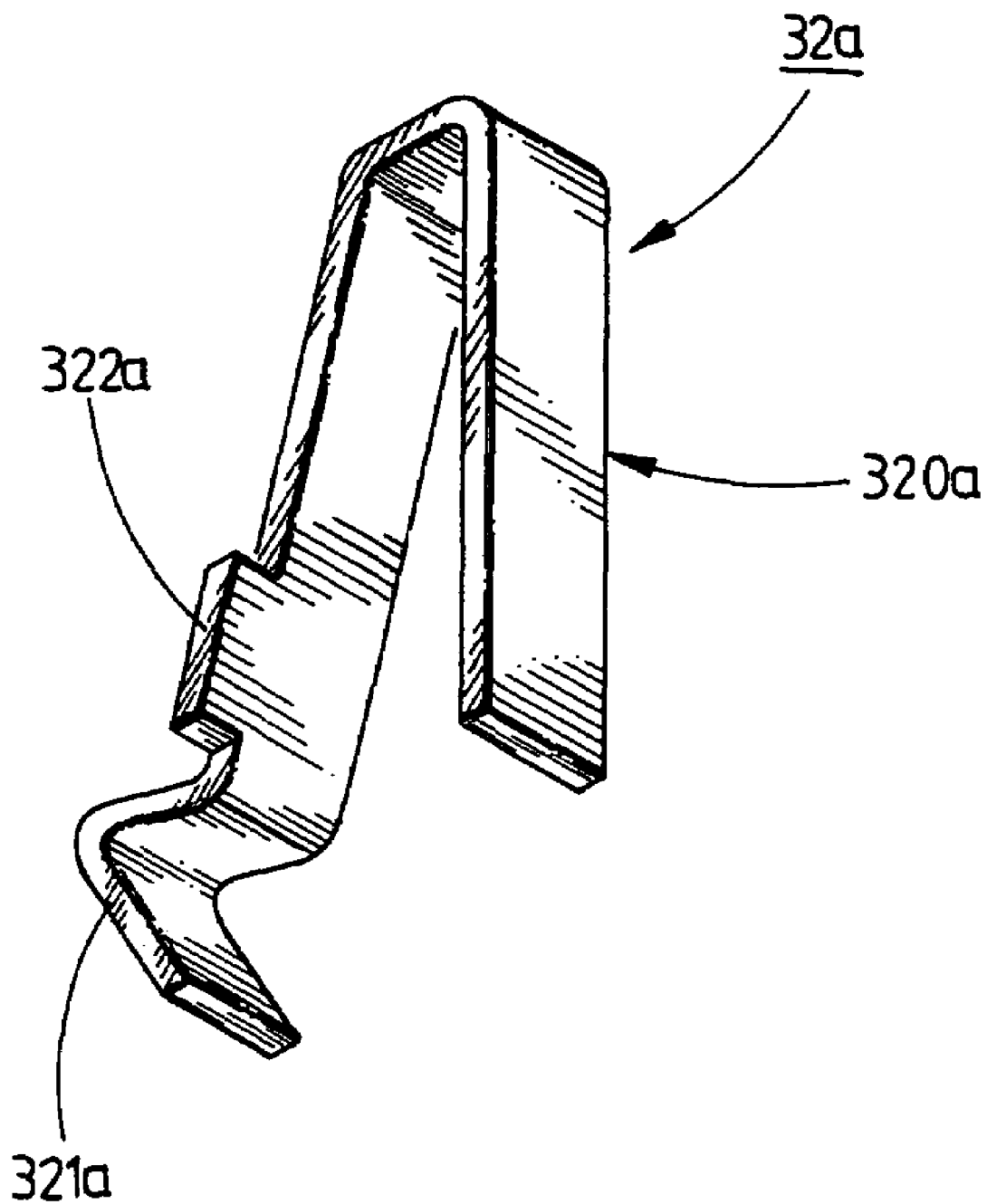
FIG. 10 is a perspective view of a latch bracket in a fixture of a traditional memory card base.

Referring to FIGS. 1 to 4, a fixture 3 of a memory card base 2 in accordance with the present invention comprises: an "S" shaped slot 221 or an inverted "S" shaped slot (Since a back-and-forth resuming movable stand 31 shown in FIGS. 1 to 3 is installed on the right side of a base 21, therefore it is an "S" shaped slot 221. If a back-and-forth resuming movable stand 31 is installed on the left side, then the left side of a cover panel 22 has an inverted "S" shaped slot) disposed on a cover panel 22 of a memory card base 2; a den 311 substantially in the shape of an acute triangle and disposed on a back-and-forth resuming movable stand 31 that is installed on a side of the base 21 of the memory card base 2 and has a pillar hole 312 or a through hole disposed at an upper edge in the den 311; and a latch hook 32 as shown in FIG. 5 being an inverted "L" shaped rod body 320 or an "L" shaped rod body (which is in the shape of a rod body and not shown in the figure, if the back-and-forth resuming movable stand 31 is disposed on the left side of the base 21), and comprises: a first protruding shaft 321 disposed on an end of the rod body 320 and a second protruding shaft 322 disposed substantially at the middle of the front side of the rod body 320. The latch hook 32 is pivotally coupled into a pillar hole 312 or a through hole in a den 311 on the back-and-forth resuming movable stand 31 by a first protruding shaft 321 on the rod body 320, and a second protruding shaft 322 on the rod body 320 is embedded into an "S" shaped slot 221 on the cover panel 22 of the card base 2 as shown in FIGS. 1 and 3 or into an inverted "S" shaped slot (not shown in the figure).

Before a memory card 1 is inserted into a memory card base 2, a second protruding shaft 322 on a latch hook 32 in a fixture 3 is situated at the front end of an "S" shaped slot 221 on a cover panel 22 of the memory card base 2 (as shown in FIG. 1) or at the front end of an inverted "S" shaped slot slightly towards the right side or the left side, and thus guiding a horizontal rod hook 323 at a lower side of an inverted "L" shaped rod body 320 or an "L" shaped rod body of the latch hook 32 to shift to the right side or the left side and move out from the protruding platform 11 at the right side of the memory card 1, so that the memory card 1 can be inserted into the memory card base 2 successfully. When the memory card 1 is inserted into the memory card base 2, the memory card 1 not only drives the back-and-forth resuming movable stand 31 on a side of the base 21 of the card base 2 to move inward, but also drives a second protruding shaft 322 on the latch hook 32 to extend into an "S" shaped slot 221 or an inverted "S" shaped slot on the cover panel 22 of the card base 2 to shift to a rear end of the "S" shaped slot 221 or the inverted "S" shaped slot slightly towards the left or right side, so as to guide the latch hook 32 to shift slightly to the left or right side and a horizontal rod hook 323 at the lower side of an inverted "L" shaped rod body 320 or a "L" shaped rod body of the latch hook 32 to shift slightly to the left or right side and latch a rectangular sheet 10 of the memory card 1 into a transversal wide "V" shaped gap 12 on the right or left side of the protruding platform 11 as shown in FIGS. 2 and 4, so as to secure the memory card 1 in the card base 2 and maintain the locked status of the memory card 1, and thus the memory card will not be loosened or fallen off easily.

What is claimed is:

1. A fixture of a memory card base, comprising:
a base, a cover panel, a back-and-forth resuming movable stand, a den disposed on a side of said base and substantially having a shape of an acute triangle and installed onto said back-and-forth resuming movable stand, characterized in that:
an "S" shaped slot or an inverted "S" shaped slot, disposed on said cover panel;
a pillar hole or a through hole, disposed on an upper edge of said den;
a latch hook, being an inverted "L" shaped rod body or an "L" shaped rod body, comprising:
a first protruding shaft, disposed at the backside of a distal end of said rod body; and
a second protruding shaft, disposed substantially at the middle of a front end of said rod body;
wherein said latch hook is pivotally coupled to said pillar hole or said through hole in said den of said back-and-forth resuming movable stand by said first protruding shaft of said rod body, and said second protruding shaft on said rod body is embedded into said "S" shaped slot or said inverted "S" shaped slot on said cover panel of said card base.

* * * * *